US012621212B2

(12) United States Patent
Hernandez Fernandez et al.

(10) Patent No.: US 12,621,212 B2
(45) Date of Patent: May 5, 2026

(54) POWER GRID SURVEILLANCE VIA TOPOLOGY DETECTION SYSTEM USING POWER LINE COMMUNICATIONS

(71) Applicants: Qatar Foundation for Education, Science and Community Development, Doha (QA); Iberdrola QSTP LLC, Doha (QA)

(72) Inventors: Javier Hernandez Fernandez, Doha (QA); Aymen Omri, Doha (QA); Roberto Di Pietro, Doha (QA)

(73) Assignees: Qatar Foundation for Education, Science and Community Development, Doha (QA); Iberdrola QSTP LLC, Doha (QA)

( * ) Notice: Subject to any disclaimer, the term of this patent is extended or adjusted under 35 U.S.C. 154(b) by 57 days.

(21) Appl. No.: 18/866,258

(22) PCT Filed: May 15, 2023

(86) PCT No.: PCT/QA2023/050006
§ 371 (c)(1),
(2) Date: Nov. 15, 2024

(87) PCT Pub. No.: WO2023/224503
PCT Pub. Date: Nov. 23, 2023

(65) Prior Publication Data
US 2025/0310206 A1 Oct. 2, 2025

Related U.S. Application Data

(60) Provisional application No. 63/364,758, filed on May 16, 2022.

(51) Int. Cl.
*H04L 41/12* (2022.01)
*H04B 3/46* (2015.01)
(Continued)

(52) U.S. Cl.
CPC ............... *H04L 41/12* (2013.01); *H04B 3/46* (2013.01); *H04B 3/544* (2013.01); *H04L 25/0212* (2013.01)

(58) Field of Classification Search
None
See application file for complete search history.

(56) References Cited

U.S. PATENT DOCUMENTS

2010/0061433 A1 3/2010 Stadelmeier et al.
2016/0164695 A1 6/2016 Fabre et al.
(Continued)

FOREIGN PATENT DOCUMENTS

WO 2012031613 A1 3/2012

OTHER PUBLICATIONS

International Search Report for related International Application No. PCT/QA2023/050006; action dated Nov. 23, 2023; (2 pages).
(Continued)

*Primary Examiner* — Chris Parry
*Assistant Examiner* — Abderrahmen Chouat
(74) *Attorney, Agent, or Firm* — K&L Gates LLP

(57) ABSTRACT

Power grid surveillance via topology detection system using power line communications (PLC) is provided by observing, at first and second times, first and second signals, respectively, sent via PLC between a plurality of nodes in an electrical grid; generating first and second lists for a given node of the plurality of nodes of channel impulses responses (CIRs) for the given node to communicate with other nodes in the plurality of nodes respectively based on the first and second signals as observed; identifying from the first list and the second list a certain node with a highest variation in CIR between the first time and the second time; sending a first token for the given node from the given node to the certain node via PLC; and in response receiving a second token
(Continued)

from the certain node at the given node, generating a topology change alert.

15 Claims, 5 Drawing Sheets

(51) Int. Cl.
    *H04B 3/54*       (2006.01)
    *H04L 25/02*     (2006.01)

(56)            References Cited

U.S. PATENT DOCUMENTS

2020/0052408 A1 *   2/2020   Rappaport ......... H01Q 21/0006
2020/0319324 A1 *  10/2020   Au ........................ H04W 48/16

OTHER PUBLICATIONS

Written Opinion for related International Application No. PCT/QA2023/050006; action dated Nov. 23, 2023; (8 pages).
Lisowski, et al.; "PLC-Enabled Low Voltage Distribution Network Topology Monitoring"; IEEE; vol. 10, No. 6; Nov. 2019; (13 pages).
Fernandez; "Strengthening the Foundations of Power Line Communications: Physical Layer Methods to Enhance and Secure the Power Grid"; ACM Digital Library; 2022; (7 pages).

* cited by examiner

200a

---

Algorithm 1 $N_i\text{-}N_j^i$ Link PL Identification Scheme

---

1: Inputs: PL ID Length: $ID_{Len}$
2:         Time Resolution
3:         Quantization Threshold: $Q_{th}$
4:         Number of Observations: $N_{Obs}$
5:         Received Signals: $y_{N_i,N_j^i}(n),\; n \in \{1,...N_{Obs}\}$ 6: Step 1: Channel Probing:
7:         Estimation of the different $N_{Obs}$ CIRs: $\hat{h}_{N_i,N_j^i}(n)$ 8: Step 1: Minimizing the Channel Estimation Error:
9:

$$\tilde{h}_{N_i,N_j^i} = \frac{\sum_{n=1}^{N_{Obs}} \hat{h}_{N_i,N_j^i}(n)}{N_{Obs}} \qquad (3)$$

10: Step 3: CIR quantization to generate the $N_i - N_j^i$ link
11:         PL ID: $ID_{N_i,N_j^i}$

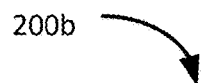

200b

---

Algorithm 2 Topology Change Detection Approach

---

1: Inputs: PL ID Length: $ID_{Len}$
2: Time Resolution
3: Quantization Threshold: $Q_{th}$
4: Number of Observations: $N_{Obs}$
5: Detection Period
6: Step 1: Initial signaling between each node $N_i$ and the different
7: other nodes.
8: Step 2: Each node $N_i$ should generate a list of
9: $N_j^i$, $j \in \{1, .., L_i\}$, nodes with significant RSSIs.
10: Step 3: Each node $N_i$ generates a list of PL IDs:
11: $ID_{N_i,N_j^i}^{(0)}$, $j \in \{1, .., L_i\}$, using Algorithm 1.
12: Step 4: Waiting for a detection period, then redo Steps 1 to 3.
13: to get a new list of PL IDs: $ID_{N_i,N_j^i}^{(1)}$.

14: Step 5: For each node $N_i$, select the node $N_{j^*}^i$, with the highest
15: PL ID variation:
16: • for $j$ from 1 to $L_i$ do
17:

$$V_j = \frac{\sum_{m=1}^{ID_{Len}} \left| ID_{N_i,N_j^i}^{(1)}(m) - ID_{N_i,N_j^i}^{(0)}(m) \right|}{\sum_{m=1}^{ID_{Len}} ID_{N_i,N_j^i}^{(0)}(m)}. \quad (4)$$

18: end for
19: • Select the node $N_{j^*}^i$ with the highest PL ID variation.
20: Step 6: Each node $N_i$, with $N_{j^*}^i \neq \emptyset$, sends its token to $N_{j^*}^i$.
21: Step 7: If there is a token exchange between two given nodes,
22: a topology change will be detected on the corresponding
23: link.

Observing PLC Signals — 310

Generate list for each node of significant other nodes — 320

Generate list of PL IDs — 330

Wait unit Next Time — 340

Identify certain node for each node with highest PL ID variation — 350

Send tokens from each given node to certain node — 360

Two nodes exchange tokens

Generate Topology Change Alert — 370

POWER GRID SURVEILLANCE VIA TOPOLOGY DETECTION SYSTEM USING POWER LINE COMMUNICATIONS

CROSS-REFERENCES TO RELATED APPLICATIONS

The present disclosure is a National Stage filing under 35 U.S.C. 371 of International Application No. PCT/QA2023/050006, filed May 15, 2023, which claims the benefit of U.S. Provisional Patent Application No.: 63/364,758 filed on May 16, 2022, and entitled "POWER GRID SURVEIL-LANCE VIA TOPOLOGY DETECTION SYSTEM USING POWER LINE COMMUNICATIONS", which is incorporated herein by reference in its entirety.

BACKGROUND

Power line communication (PLC) is currently one of the most popular telecommunications technologies for smart grids. The deployment of PLC-based smart grids enables two-way communication between the utility assets in a cost-efficient manner as it allows for the reuse of existing network infrastructure. PLC technology is mature, cost-effective, and has a wide range of applications such as advanced metering infrastructure (AMI), grid management, and energy loss detection.

SUMMARY

The present disclosure generally relates to a system and method for detecting changes in topology of a portion of a power grid. In particular, the present disclosure provides a distributed and fully channel impulse response (CIR) based algorithm to efficiently detect and identify topology changes in an electrical grid.

In light of the present disclosure, and without limiting the scope of the disclosure in any way, in an aspect of the present disclosure, which may be combined with any other aspect listed herein unless specified otherwise, a computing system for detecting topology changes in an electrical grid is provided. The computing system includes one or more processors and a memory in communication with the one or more processors that stores instructions. The one or more processors are configured to execute the instructions to perform operations that include: observing, at a first time, first signals sent via Power Line Communication (PLC) between a plurality of nodes in an electrical grid; generating a first list for a given node of the plurality of nodes of first channel impulses responses (CIRs) for the given node to communicate with other nodes in the plurality of nodes based on the first signals as observed; observing, at a second time subsequent to the first time, second signals sent via Power Line Communication (PLC) between the plurality of nodes in the electrical grid; generating a second list for the given node of the plurality of nodes of second CIRs for the given node to communicate with the other nodes in the plurality of nodes based on the second signals as observed; identifying from the first list and the second list a certain node with a highest variation in CIR between the first time and the second time; sending a first token for the given node from the given node to the certain node via PLC; and in response receiving a second token from the certain node at the given node, generating a topology change alert.

In an aspect of the disclosure, the operations further include: ignoring or removing quiet nodes from the first list and the second list from the other nodes of the plurality of nodes, wherein the quiet nodes are observed at the first time as having a received signal strength indicator (RSSI) below a threshold value.

In an aspect of the disclosure, the operations further include: reducing channel estimation errors for each CIR between each pair of nodes in the plurality of nodes when generating a link power line identification (PL ID) for a given pair of nodes.

In an aspect of the disclosure, inputs for determining a CIR include a time resolution, a quantization threshold, a number of observations, and a received signal.

The reader will appreciate the foregoing details, as well as others, upon considering the following detailed description of certain non-limiting embodiments including a system and method for detecting an abusive online content according to the present disclosure.

BRIEF DESCRIPTION OF THE DRAWINGS

FIG. 2A-2B illustrate algorithms as may be used for power grid surveillance, according to aspects of the present disclosure.

DETAILED DESCRIPTION

The present disclosure generally relates to a system, a method, and a computer readable storage device for detecting topology changes in an electrical grid. According to an embodiment of the present disclosure, a novel algorithm to detect changes in topology of an electrical grid via PLC is provided, which may be provided a method, a computer-readable storage device having instructions that are executable by a processor to perform the method, or a computing system having at least one processor and at least one memory including instructions executable by the processor to perform the method.

Figure 1:
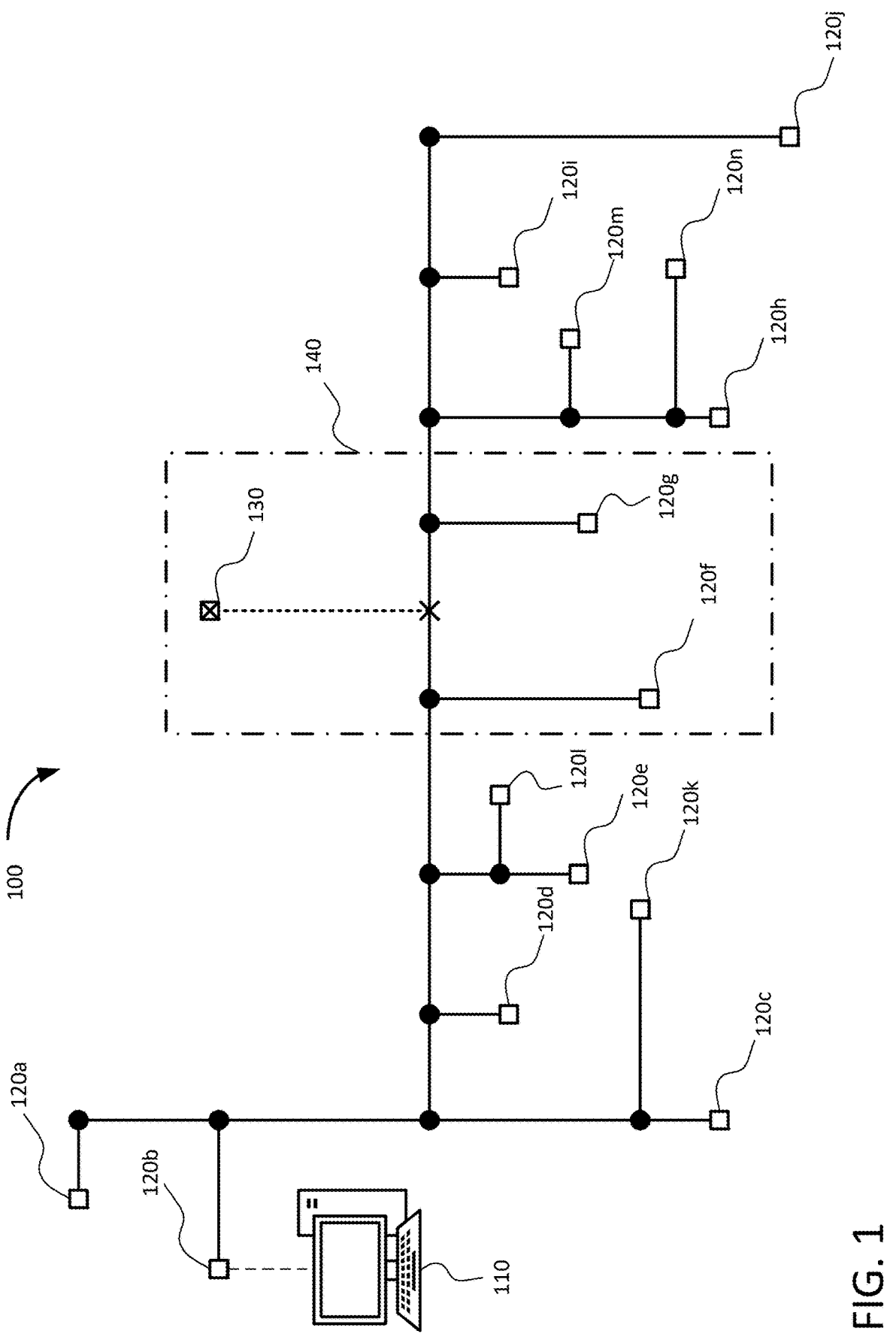
FIG. 1 illustrates an example power grid, according to aspects of the present disclosure.

FIG. 1 illustrates an example power grid 100, according to aspects of the present disclosure. A controller 110, which may be a computing device 400 (as discussed in greater detail in regard to FIG. 4) is connected to the gird 100 to monitor a topology between a plurality of nodes 120*a-n* (generally or collectively, nodes 120). The nodes 120 may be any "smart" element of a power grid 100 and may include a computing device 400 used to send and receive signals sent via PLC, among other functionality (e.g., monitoring power generation, monitoring power consumption, adjusting power generation/consumption based on grid conditions, etc.). Although shown in FIG. 1 with fourteen nodes 120 as a non-limiting example of a power grid 100, one of ordinary skill in the relevant art will understand that any number of nodes 120 in various arrangements may make up a power grid 110.

Each of the nodes 120 are connected to other nodes 120 via various power lines. The power lines 130 can include high voltage (HV) lines, medium voltage (MV) lines, and low voltage (LV) lines; the definition of which may vary in different region with different power carrying regulations, but will be understood by those of ordinary skill in the relevant art.

The topology of the power grid 100 and the connections between the nodes 120 may be represented by a network map that described the physical layout and interconnection between multiple nodes 120. This map may be used to monitor the removal or addition of devices to the network, detect anomalies, and identify malicious intrusions, while also optimizing the dispatch of crews to solve the issues. Changes in the topology of the power grid 100 may be the result of extensions of the power grid 100 (legitimate or otherwise), loss of service in a section of the power grid 100 (e.g., a line disconnect due to storm, accident, or division of the power grid 100), line switching within the power grid 100. A changed node 130 is shown in FIG. 1 connected to the power grid 100 at a location between where the sixth node 120f and the seventh node 120g are respectively connected to the power grid 100. In various embodiments, the changed node 130 may be a "new" node 120 that is added to the topology at time t+1 that was not present at time t or a "removed" node that is disconnected from the topology at time t+1 that was connected at time t.

This changed node 130 may not be responsive to communications sent via PLC, either due to not being capable of responding (e.g., due to being disconnected or being a connected device lacking communication functionality) or actively choosing not to respond, but still has an effect on communications between responsive nodes 120. Accordingly, even though the changed node 130 may not report the change in the topology to the controller 110, the controller 110 may, according to the present disclosure, use the path delay of the CIR via a distributed and deterministic algorithm to identify and locate changes in the power grid 100. By identifying the two nodes 120 that are most affected by the addition or removal of the changed node 130, the present disclosure provides operators with increased insight into the functionality of a power grid 100 using PLC.

Generally, PLC experiences higher noise levels over higher voltage lines than over lower voltage lines, and higher voltage lines act as transmission lines from which lower voltage lines branch off from. One of the primary advantages of PLC, when connected to the electrical grid, is its ability to communicate information about the power grid itself. Exploiting the physical properties of the transmission medium has proven to be an effective approach. However, the time response of a pair of channels between two points/ports is not necessarily symmetric due to the inability to leverage CSI reciprocity (with the exception of channel path delay). Notably, when a signal travels from node 1 to node 2 and back, the channel's multipath response features peaks in identical positions on both paths. However, the heights of the peaks vary, rendering a channel multipath response that is not perfectly symmetrical and limiting perfect symmetry to only the position of the impulses. In PLC, the keyhole effect, as well as the influence of the keyhole effect on diversity gain, causes crosstalk, resulting in channel response correlation LV topology involves two distinguishable segments: the distribution network, managed by the power utility, and the in-building or in-home segment. In either case, the predominant topology is a radial network that expands into branching lines from the transformer station to the final customer. PLC may be used in both sections, covering a wide range of smart grid applications, such as metering, access networks, electric vehicles, or grid control. Depending on the local regulations, the boundary between the in-home and distribution networks usually lies in the electrical meter or the protection/fuse box on the customer's premises. LV lines in the in-home segment are more prone to topological than MV or HV line changes, as an average household or building would regularly see appliances being connected and disconnected from the network, whereas the power grid operator is less likely to perform maintenance or extension work, or experience faults.

In PLC, signals are restricted to the transmission medium and therefore bound to the LV network between customers and transformers or between the transformers stations (MV) being interconnected. Another impairment for signal propagation is the attenuation produced by the LV lines' electrical protection and distribution equipment, such as street cabinets and customers' fuse boxes. The higher attenuation of these devices in broadband (BB) PLC produces a significant signal loss that, combined with the higher noises levels usually experienced in households, can filter the signal entirely, isolating the in-home network from the power utility segment or other neighboring networks.

FIG. 1 may be understood as a point to point model between the sixth node 120f and 120g by ignoring the rest of the topology, and focusing on inset 140. Inset 140 consists of a direct connection between two nodes 120, and a middle branch at a given point X with a termination point at the changed node 140. For this configuration, the signal takes a first direct path (node 120f to node 120g) and a nearly unlimited number of secondary paths as a result of the signal bouncing between the sixth node 120f and the seventh node 120g i times. Stated differently, for the direct path (when i=0) the first path is [node 120f to node 120g], then for a first bounce (when i=1) the second path is [node 120f to node 120g to node 120f to node 120g], then for a second bound (when i=2), the third path is [node 120f to node 120g to node 120f to node 120g to node 120f to node 120g], etc. Due to the multiple reflections, there is a virtually infinite number of secondary paths arriving at the seventh node 120g from the sixth node 120f. Assuming that the signal will be significantly attenuated after N reflections and/or discontinuity crossings, only the significant path with a gain equal to or larger than a given threshold will be considered. Accordingly, the present disclosure uses an algorithm to exhaustively identify the significant paths and the corresponding delays and gains between any two nodes 120 of the considered multi-node topology.

By adding the changed node 130 between the sixth node 120f and the seventh node 120g additional reflection paths are added; altering how each of the sixth node 120f and the seventh node 120g observe signals sent between one another. Similarly, by removing the changed node 130 from between the sixth node 120f and the seventh node 120g several reflection paths are removed; altering how each of the sixth node 120f and the seventh node 120g observe signals sent between one another.

When considering the entire topology shown in FIG. 1, which is a more complex topology than that shown in the inset 140, in which multiple nodes 120 are connected to a main backbone/power line at different discontinuity points or middle branches, the changes in topology affect multiple signal paths (e.g., from node 120a to node 120m, from node 120f to node 120g, from node 120a to node 120f, from node 120b to node 120g, etc.). However, due to signal attenuation, the greatest change is observable by the closest nodes 120. Accordingly, by observing which nodes 120 report the greatest change in signal quality between one another from time t to time t+2, an operator may use the present disclosure to localize where a changed node 130 is added to or removed from the topology at time t+1.

FIG. 2A-2B illustrate algorithms 200a-b as may be used for power grid surveillance, according to aspects of the present disclosure. The algorithms 200*a-b* detect topology changes using power line identification (PL ID) between two nodes (nodes $N_i$ and $N_j^i$) in the topology under consideration. Advantageously, the algorithms 200*a-b* operated without the need of a machine learning model to be trained or deployed, and can operate in a distributed system where one or more controllers 110 are located at various points in the topology.

The inputs for the algorithms 200*a-b* are system parameters, which may include the PL ID length (in bits), the time resolution, the quantization threshold, the number of observations, and the different received signals, which can be preset for the PLC system in use. In some embodiments, the algorithms probe the channels to estimate different CIRs from the received signals, which may be reduced or minimized by evaluating the average of the estimated CIRs. The algorithms 200*a-b* then generate the PL ID $ID(N_i, N_j^i)$ for a link between two nodes under observation and makes subsequent observations at different times for those nodes (e.g., $ID(N_i, N_j^i)^{(0)}$, $ID(N_i, N_j^i)^{(1)}$, $ID(N_i, N_j^i)^{(2)}$, etc.). When the bit mismatch rate (BMR) between two subsequent observations (e.g., $ID(N_i, N_j^i)^{(t)}$, $ID(N_i, N_j^i)^{(t+1)}$) is larger than a predefined threshold, the algorithms 200*a-b* declare that a topology change has been detected.

Figure 3:
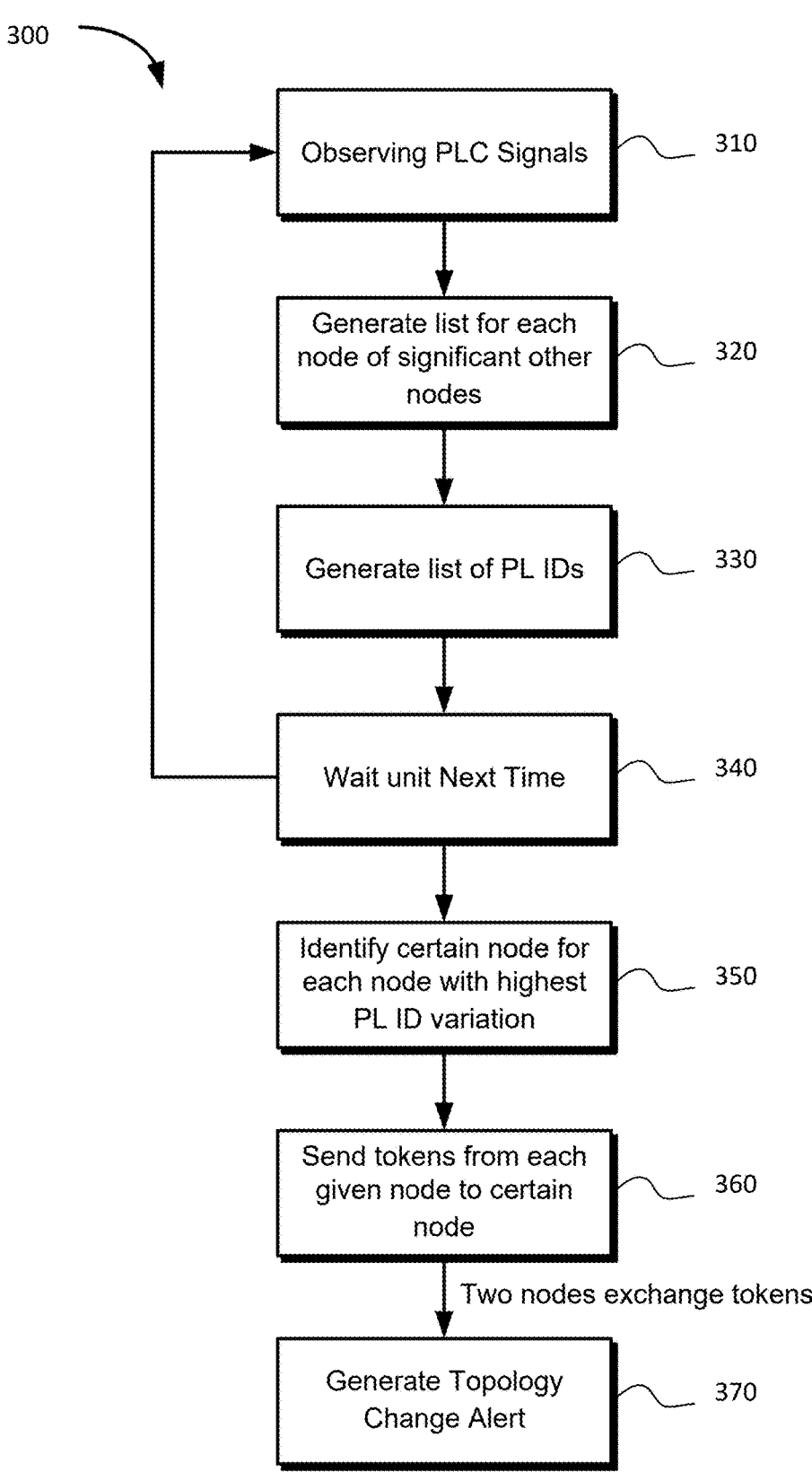
FIG. 3 is a flowchart of an example method for power grid surveillance, according to aspects of the present disclosure.

FIG. 3 is a flowchart of an example method 300 for power grid surveillance, according to aspects of the present disclosure.

At block 310, the controller performs observes PLC signals initiated between each node $N_i$ and the different other nodes in the electrical grid. Each observation is performed at a distinct time (e.g., time t, t+1, t+2, etc.) for comparison across several iterations of block 310 to detect potential changes in the topology of the grid over time.

At block 320, the controller generates a list for each node $N_i$ of $N_j^i$, $j \in \{1, \ldots, L_i\}$, for the nodes with significant received signal strength indicators (RSSIs) or RSSI above a predefined threshold, where node $N_j^i$ denotes the jth node in node $N_i$'s list of length $L_i$. Stated defiantly, at block 320, the controller identifies which node to ignore or remove from this list for analysis between time t and t+1 as "quiet nodes" that are observed at time t as having a received signal strength indicator (RSSI) below a threshold value.

At block 330, the controller generates a list of PL IDs for each node $N_i$ for each pair of other nodes for the node $N_i$ in the list generated in block 320 as described above $ID(N_i, N_j)^{(t)}$, $j \in \{1, \ldots, L_i\}$. When understood from the perspective of analyzing a particular or given node of the grid, the controller generates a list for a given node (and all other nodes) of the plurality of nodes of first channel impulses responses (CIRs) for the given node to communicate with other nodes in the plurality of nodes based on the signals as observed from block 310 for the corresponding time iteration.

At block 340, the controller waits a predefined amount of time and returns to block 310 to perform the operations of block 310-330 at a subsequent time to generate a later list of PL IDs for each pair of other nodes for the node $N_i$ in the list generated in the second operation as described above $ID(N_i, N_j)^{(t+1)}$, $j \in \{1, \ldots, L_i\}$ to compare the same pairs nodes identified in the earlier instance of the second operation.

At block 350, the controller identifies the node $N_j^i$ for each node $N_i$ with the highest PL ID variation between the two times t and t+1 (e.g., from the earlier and subsequent iterations of blocks 310-330, respectively) to determine the variation $V_j$ as a ratio of the number of mismatching bits between $ID(N_i, N_j^i)^{(t)}$ and $ID(N_i, N_j^i)^{(t+1)}$ and the number of bits in $ID(N_i, N_j^i)^{(t)}$ that are set to one. When understood from the perspective of analyzing a particular or given node of the grid, the controller identifies from the list from time t and the list from time t+1 a certain node with a highest variation in CIR between the two times.

At block 360, the controller sends a token from each given node $N_i$ to the other node with the highest PL ID variation (e.g., the certain node for each given node) between times t and t+1 as selected per block 360. When understood from the perspective of analyzing a particular or given node of the grid, the controller causes the given node to send a first token to the certain node.

At block 370, in response to two nodes receiving tokens from each other, generates a topology change alert. When understood from the perspective of analyzing a particular or given node of the grid, when the given node sends a first token to a certain node, and also receives a token from the certain node, the controller may generate a topology change alert. If no two nodes receive tokens from each other between time t and time t+1, the controller does not generate a topology change alert, and may continue monitoring the electrical grid for a change in topology for a subsequent time (e.g., time t+2) per blocks 310-330.

Figure 4:
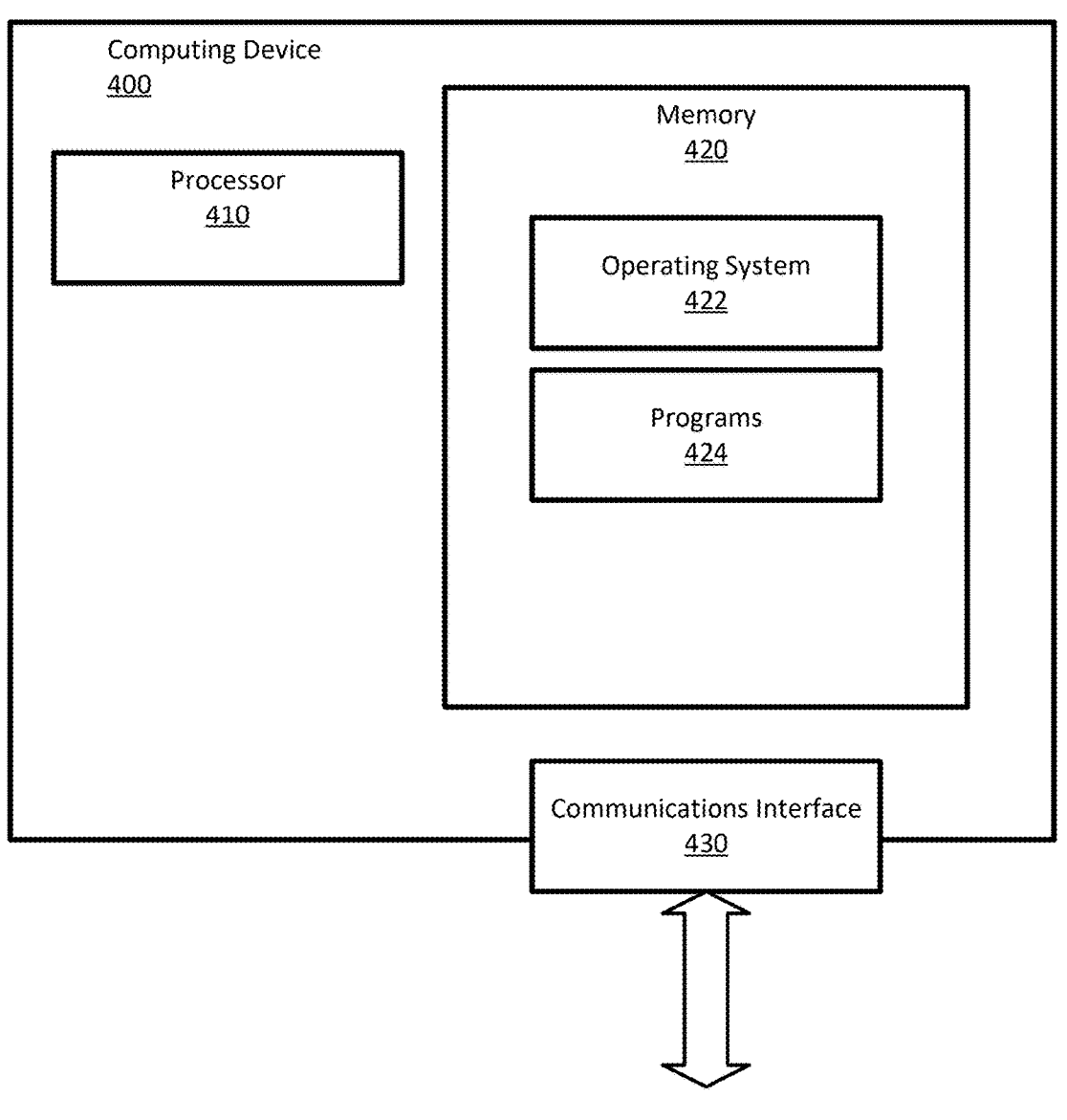
FIG. 4 illustrates physical components of an example computing device, according to aspects of the present disclosure

FIG. 4 illustrates physical components of an example computing device 400, according to aspects of the present disclosure. The computing device 400 may include at least one processor 410, a memory 420, and a communication interface 430 and may be used as a controller for the controller 110 described herein.

The processor 410 may be any processing unit capable of performing the operations and procedures described in the present disclosure, which may include the algorithms shown in FIGS. 2A-2B and the operations shown in FIG. 3. In various embodiments, the processor 410 can represent a single processor, multiple processors, a processor with multiple cores, and combinations thereof.

The memory 420 is an apparatus that may be either volatile or non-volatile memory and may include RAM, flash, cache, disk drives, and other computer readable memory storage devices. Although shown as a single entity, the memory 420 may be divided into different memory storage elements such as RAM and one or more hard disk drives. As used herein, the memory 420 is an example of a device that includes computer-readable storage media, and is not to be interpreted as transmission media or signals per se.

As shown, the memory 420 includes various instructions that are executable by the processor 410 to provide an operating system 422 to manage various features of the computing device 400 and one or more programs 424 to provide various functionalities to users of the computing device 400, which include one or more of the features and functionalities described in the present disclosure. One of ordinary skill in the relevant art will recognize that different approaches can be taken in selecting or designing a program 424 to perform the operations described herein, including choice of programming language, the operating system 422 used by the computing device 400, and the architecture of the processor 410 and memory 420. Accordingly, the person of ordinary skill in the relevant art will be able to select or design an appropriate program 424 based on the details provided in the present disclosure.

The communication interface 430 facilitates communications between the computing device 400 and other devices, which may also be computing devices 400 as described in relation to FIG. 4. In various embodiments, the communication interface 430 includes antennas for wireless communications and various wired communication ports. The computing device 400 may also include or be in communication, via the communication interface 430, one or more input devices (e.g., a keyboard, mouse, pen, touch input device, etc.) and one or more output devices (e.g., a display, speakers, a printer, etc.).

Accordingly, the computing device 400 is an example of a system that includes a processor 410 and a memory 420 that includes instructions that (when executed by the processor 410) perform various embodiments of the present disclosure. Similarly, the memory 420 is an apparatus that includes instructions that when executed by a processor 410 perform various embodiments of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which, when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer-readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

Without further elaboration, it is believed that one skilled in the art can use the preceding description to use the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A method, comprising:

observing, at a first time, first signals sent via Power Line Communication (PLC) between a plurality of nodes in an electrical grid;

generating a first list for a given node of the plurality of nodes of first channel impulse responses (CIRs) for the given node to communicate with other nodes in the plurality of nodes based on the first signals as observed;

observing, at a second time subsequent to the first time, second signals sent via PLC between the plurality of nodes in the electrical grid;

generating a second list for the given node of the plurality of nodes of second CIRs for the given node to communicate with the other nodes in the plurality of nodes based on the second signals as observed;

identifying from the first list and the second list a certain node with a highest variation in CIR with the given node between the first time and the second time;

sending a first token for the given node from the given node to the certain node via PLC; and in response receiving a second token from the certain node at the given node, generating a topology change alert.

2. The method of claim 1, further comprising:

ignoring or removing quiet nodes from the first list and the second list from the other nodes of the plurality of nodes, wherein the quiet nodes are observed at the first time as having a received signal strength indicator (RSSI) below a threshold value.

3. The method of claim 1, further comprising, reducing channel estimation errors for each CIR between each pair of nodes in the plurality of nodes when generating a link power line identification (PL ID) for a given pair of nodes.

4. The method of claim 1, wherein inputs for determining a CIR include a time resolution, a quantization threshold, a number of observations, and a received signal.

5. The method of claim 1, wherein the highest variation in CIR between the first time and the second time occurs in response to a changed node being added to the electrical grid between the given node and the certain node.

6. The method of claim 1, wherein the highest variation in CIR between the first time and the second time occurs in response to a changed node being removed from the electrical grid between the given node and the certain node.

7. A system, comprising:

a processor; and a memory, including instructions that when executed by the processor perform operations comprising:

observing, at a first time, first signals sent via Power Line Communication (PLC) between a plurality of nodes in an electrical grid;

generating a first list for a given node of the plurality of nodes of first channel impulse responses (CIRs) for the given node to communicate with other nodes in the plurality of nodes based on the first signals as observed;

observing, at a second time subsequent to the first time, second signals sent via PLC between the plurality of nodes in the electrical grid;

generating a second list for the given node of the plurality of nodes of second CIRs for the given node to communicate with the other nodes in the plurality of nodes based on the second signals as observed;

identifying from the first list and the second list a certain node with a highest variation in CIR with the given node between the first time and the second time;

sending a first token for the given node from the given node to the certain node via PLC; and in response receiving a second token from the certain node at the given node, generating a topology change alert.

8. The system of claim 7, the operations further comprising:

ignoring or removing quiet nodes from the first list and the second list from the other nodes of the plurality of nodes, wherein the quiet nodes are observed at the first time as having a received signal strength indicator (RSSI) below a threshold value.

9. The system of claim 7, the operations further comprising, reducing channel estimation errors for each CIR between each pair of nodes in the plurality of nodes when generating a link power line identification (PL ID) for a given pair of nodes.

10. The system of claim 7, wherein inputs for determining a CIR include a time resolution, a quantization threshold, a number of observations, and a received signal.

11. The system of claim 7, wherein the highest variation in CIR between the first time and the second time occurs in response to a changed node being added to the electrical grid between the given node and the certain node.

12. The system of claim 7, wherein the highest variation in CIR between the first time and the second time occurs in response to a changed node being removed from the electrical grid between the given node and the certain node.

13. A memory, including instructions that when executed by a processor perform operations comprising:

observing, at a first time, first signals sent via Power Line Communication (PLC) between a plurality of nodes in an electrical grid;

generating a first list for a given node of the plurality of nodes of first channel impulse responses (CIRs) for the given node to communicate with other nodes in the plurality of nodes based on the first signals as observed;

observing, at a second time subsequent to the first time, second signals sent via PLC between the plurality of nodes in the electrical grid;

generating a second list for the given node of the plurality of nodes of second CIRs for the given node to communicate with the other nodes in the plurality of nodes based on the second signals as observed;

identifying from the first list and the second list a certain node with a highest variation in CIR with the given node between the first time and the second time;

sending a first token for the given node from the given node to the certain node via PLC; and in response receiving a second token from the certain node at the given node, generating a topology change alert.

14. The memory of claim 13, the operations further comprising:

ignoring or removing quiet nodes from the first list and the second list from the other nodes of the plurality of nodes, wherein the quiet nodes are observed at the first time as having a received signal strength indicator (RSSI) below a threshold value.

15. The memory of claim 13, wherein the highest variation in CIR between the first time and the second time occurs in response to a changed node being added to the electrical grid between the given node and the certain node.

* * * * *